US011279382B2

(12) United States Patent
Riegraf et al.

(10) Patent No.: US 11,279,382 B2
(45) Date of Patent: Mar. 22, 2022

(54) TRANSPORT CARRIAGE AND SYSTEM FOR TRANSPORTING OBJECTS

(71) Applicant: EISENMANN SE, Boeblingen (DE)

(72) Inventors: Martin Riegraf, Reutlingen (DE); Joerg Robbin, Ammerbuch-Pfaeffingen (DE)

(73) Assignee: PENTANOVA CS GMBH, Böblingen (DE)

( * ) Notice: Subject to any disclaimer, the term of this patent is extended or adjusted under 35 U.S.C. 154(b) by 117 days.

(21) Appl. No.: 15/559,729

(22) PCT Filed: Feb. 25, 2016

(86) PCT No.: PCT/EP2016/000322
§ 371 (c)(1),
(2) Date: Sep. 19, 2017

(87) PCT Pub. No.: WO2016/150543
PCT Pub. Date: Sep. 29, 2016

(65) Prior Publication Data
US 2018/0099681 A1   Apr. 12, 2018

(30) Foreign Application Priority Data

Mar. 21, 2015 (DE) ..................... 10 2015 003 736.6

(51) Int. Cl.
*B61C 13/04* (2006.01)
*B61B 5/00* (2006.01)
(Continued)

(52) U.S. Cl.
CPC ............... *B61C 13/04* (2013.01); *B61B 5/00* (2013.01); *B61B 13/04* (2013.01); *B65G 17/36* (2013.01); *Y02T 30/00* (2013.01)

(58) Field of Classification Search
CPC .......... B61C 13/04; B61B 13/04; B61B 5/00; B61B 3/02; B65G 17/36; B65G 35/06; B65G 2201/0294; B62D 65/18
See application file for complete search history.

(56) References Cited

U.S. PATENT DOCUMENTS

| 601,296 A | * | 3/1898 | Wheelock | ............... B61C 11/04 |
| | | | | 105/29.1 |
| 1,704,958 A | * | 3/1929 | Wichert | .................. B61C 11/04 |
| | | | | 105/29.1 |

(Continued)

FOREIGN PATENT DOCUMENTS

| CN | 102 490 727 | 6/2012 |
| DE | 10 2008 032 151 A1 | 1/2010 |

(Continued)

*Primary Examiner* — Zachary L Kuhfuss
(74) *Attorney, Agent, or Firm* — Schroeder Intellectual Property Law Group, LLC (57) ABSTRACT

A transport carriage for transporting workpieces, the transport carriage being movable on a mounting rail in a transport direction. The transport carriage has a transport carriage chassis which supports at least one drive roller that can roll on a drive running surface of the mounting rail and can be driven by a drive motor, the drive motor being carried along with the transport carriage chassis. The transport carriage additionally includes at least one securing device for at least one workpiece. The transport carriage carries along an autonomous power supply device which can supply the drive motor with power. A system is additionally provided for transporting workpieces, having a rail system which has at least one mounting rail and includes at least one such transport carriage which can be moved on the mounting rail in a transport direction.

10 Claims, 8 Drawing Sheets

(51) Int. Cl.
*B61B 13/04* (2006.01)
*B65G 17/36* (2006.01)

(56) References Cited

U.S. PATENT DOCUMENTS

| | | | | | |
|---|---|---|---|---|---|
| 4,776,282 | A | * | 10/1988 | Ishikura | B61C 13/04 104/109 |
| 4,901,648 | A | * | 2/1990 | Moore | B60T 7/126 104/250 |
| 4,944,230 | A | * | 7/1990 | Maeda | B61B 13/00 104/139 |
| 5,165,348 | A | * | 11/1992 | Wakabayashi | B61C 13/04 105/29.1 |
| 5,174,217 | A | * | 12/1992 | Wakabayashi | B61C 13/04 105/29.1 |
| 5,235,917 | A | * | 8/1993 | Luck | B61C 13/04 104/119 |
| 5,388,684 | A | * | 2/1995 | Peck | B65G 35/06 198/465.1 |
| 5,450,796 | A | * | 9/1995 | Sakagami | B61C 13/04 104/89 |
| 5,901,650 | A | * | 5/1999 | Turner | B61B 12/022 104/88.01 |
| 5,979,334 | A | * | 11/1999 | Lund | B61B 13/00 104/130.07 |
| 6,129,025 | A | * | 10/2000 | Minakami | B60L 5/005 104/88.01 |
| 6,178,891 | B1 | * | 1/2001 | Ostholt | B61C 13/04 104/89 |
| 6,192,803 | B1 | * | 2/2001 | Nishino | B61C 13/04 104/249 |
| 6,305,296 | B1 | * | 10/2001 | Wilkinson | B61C 13/04 105/133 |
| 6,494,304 | B1 | * | 12/2002 | Jaynes | B61B 10/025 104/172.1 |
| 6,595,141 | B2 | * | 7/2003 | Ishikawa | B61B 13/00 104/163 |
| 7,798,068 | B2 | * | 9/2010 | Nishihara | B61B 3/02 104/172.4 |
| 9,394,110 | B2 | * | 7/2016 | Robbin | B62D 65/18 |
| 9,533,830 | B2 | * | 1/2017 | Lingenhoel | B65G 17/14 |
| 9,688,478 | B2 | * | 6/2017 | Robbin | B05B 13/0221 |
| 10,106,337 | B2 | * | 10/2018 | Robbin | B65G 49/0459 |
| 10,124,958 | B2 | * | 11/2018 | Robbin | B65G 35/06 |
| 10,526,030 | B2 | * | 1/2020 | Kapuria | B62D 57/024 |
| 2008/0148546 | A1 | * | 6/2008 | Monti | B62D 65/18 29/525.14 |
| 2008/0251354 | A1 | * | 10/2008 | Ruggaber | B62D 65/18 198/463.1 |
| 2011/0017132 | A1 | * | 1/2011 | Robbin | B65G 49/0463 118/423 |
| 2013/0206059 | A1 | * | 8/2013 | Robbin | B65G 49/0459 118/423 |
| 2017/0282937 | A1 | * | 10/2017 | You | B61B 13/04 |
| 2018/0099681 | A1 | * | 4/2018 | Riegraf | B61C 13/04 |
| 2018/0120028 | A1 | * | 5/2018 | Robbin | B05B 13/0221 |
| 2018/0265151 | A1 | * | 9/2018 | Riegraf | B62D 65/18 |

FOREIGN PATENT DOCUMENTS

| | | |
|---|---|---|
| DE | 10 2010 041 894 A1 | 4/2012 |
| EP | 0 577 917 A1 | 1/1994 |
| EP | 0 582 348 | 2/1994 |
| EP | 1 352 817 A1 | 10/2003 |
| JP | 2012-121652 A | 6/2012 |
| WO | 2009/059362 A1 | 5/2009 |

\* cited by examiner

TRANSPORT CARRIAGE AND SYSTEM FOR TRANSPORTING OBJECTS

RELATED APPLICATIONS

This application is a national phase of International Patent Application No. PCT/EP2016/000322 filed Feb. 25, 2016, which claims the filing benefit of German Patent Application No. 10 2015 003 736.6 filed Mar. 21, 2015, the contents of both of which are incorporated herein by reference.

FIELD OF THE INVENTION

The invention relates to a trolley for the transportation of workpieces, said trolley being movable in a transport direction on a carrier rail, comprising
a) a trolley chassis, which supports at least one drive roller that is rollable on a drive running surface of the carrier rail and is drivable by means of a drive motor, which latter is carried along by the trolley chassis;
b) at least one fastening device for at least one workpiece.
In addition, the invention relates to a plant for the transportation of objects, comprising
a) a rail system, which comprises at least one carrier rail;
b) at least one trolley movable in a transport direction on the carrier rail.

BACKGROUND OF THE INVENTION

In plants of this type, the trolleys must be supplied with power, for which purpose, in the case of commercially known plants, busbars are laid along the carrier rail, from which busbars a trolley can obtain power via appropriately adapted current collectors. This can be done via contact lines or contactlessly.

However, a power supply of this type is structurally very complex, maintenance-intensive and fragile. Moreover, stoppages frequently arise when there are problems with the power supply, since generally the rail system too is then affected.

SUMMARY OF THE INVENTION

An object of the invention is therefore to provide a trolley and plant of the type stated in the introduction, which enable an efficient, maintenance-friendly and reliable operation.

This object may be achieved in a trolley of the type stated in the introduction by virtue of the fact that
c) the trolley carries along with it an autonomous power supply device, by means of which the drive motor can be supplied with power.

In this way, an installation for supplying power along the carrier rail can be dispensed with. A failure of the power supply of a trolley is then always confined to the trolley itself, so that a defective trolley of this kind can be exchanged without the rail system needing to be worked on.

It is here particularly favorable if the autonomous power supply device comprises at least one rechargeable energy store. For this, accumulators or capacitors, in particular, can be considered.

If the trolley chassis comprises a leading unit, which runs ahead in the transport direction, and a trailing unit, which runs behind in the transport direction, said units being coupled with the fastening device, the system can be of curved configuration when the coupling points are formed by appropriate rotary couplings.

With regard to the drive, it is here advantageous if
a) the leading unit bears a drive roller and a drive motor; and/or
b) the trailing unit bears a drive roller and a drive motor; wherein
c) the leading unit and/or the trailing unit bear(s) at least one rechargeable energy store.

Thus only the leading unit or only the trailing unit, or each of the two units can be driven. In this case, the driven unit does not always have also to bear an energy store.

As an effective drive concept, it can be provided that the trolley is configured as a transport train, in which the trolley chassis comprises a drive unit and one or more passive transport units, which are releasably coupled with one another, wherein at least the transport units respectively comprise a fastening device. In this way, savings can be made on drive components.

It can here be favorable if the trolley chassis comprises as the drive unit a drivable transport unit, having a chassis which carries the at least one drive roller along with it, and a fastening device for at least one workpiece. In this case, the drive unit is used for the transport of workpieces.

Alternatively, it can be favorable if the trolley chassis comprises as the drive unit a towing trolley without carrying function and having a chassis unit which carries along with it the at least one drive roller. In this case, a type of loco principle is realized.

In both concepts, it is of advantage if the drive unit carries along with it the autonomous power supply unit. No lengthy connections of the power source to the drive motor, or power couplings between individual chassis regions, are then necessary.

The above-described object is achieved in a plant of the type stated in the introduction by virtue of the fact that the trolley is a trolley having some or all of the above-described features.

This conveying and power supply concept can be implemented particularly effectively if the carrier rail is fixed to the ground.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

Illustrative embodiments of the invention are explained in greater detail below on the basis of the drawings, in which.

DETAILED DESCRIPTION OF THE PRESENT INVENTION

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Figure 1:
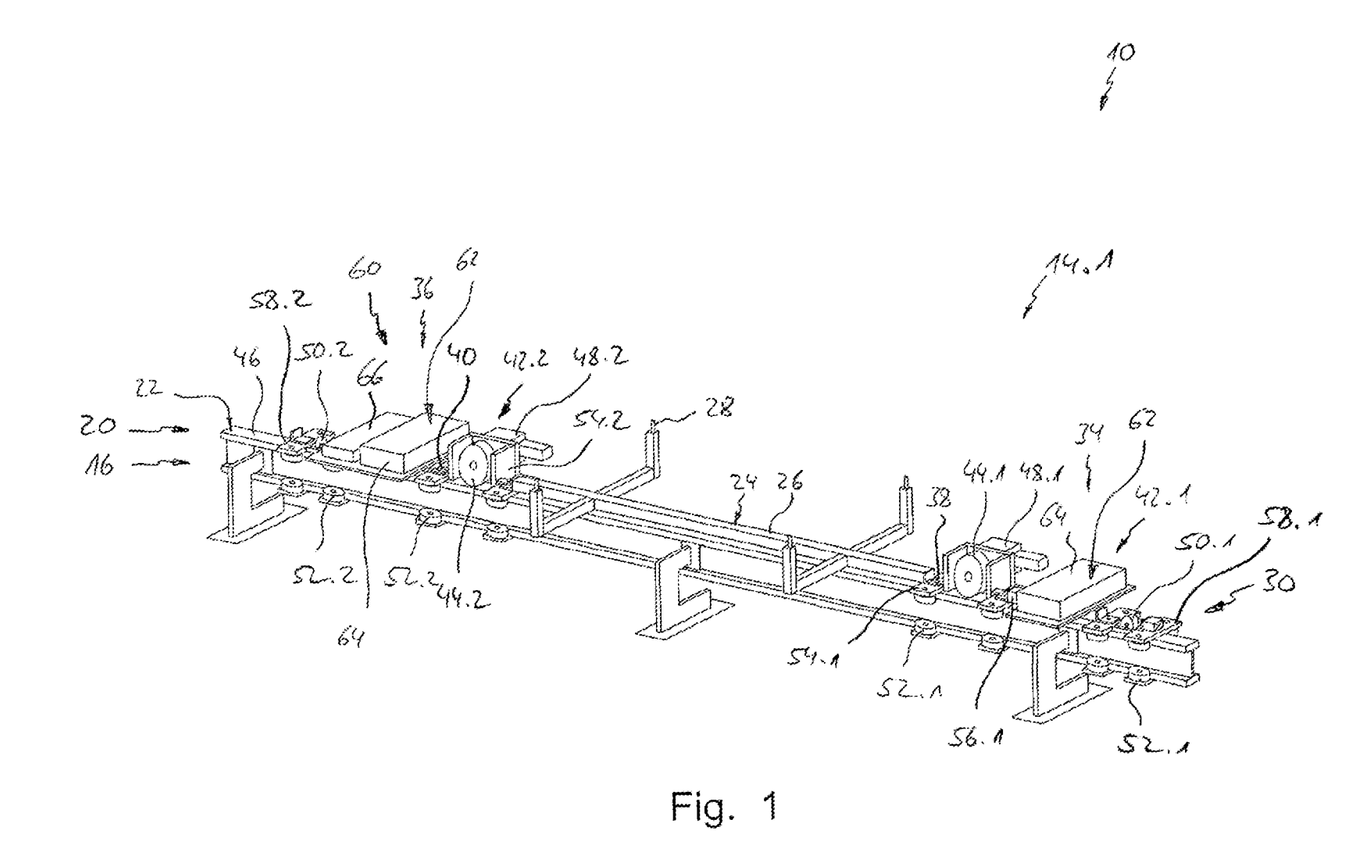
FIG. 1 shows a perspective view of a plant for the transportation of workpieces, wherein a portion of a carrier rail of a rail system, with a trolley which is movable on said carrier rail, is shown.
Figure 2:
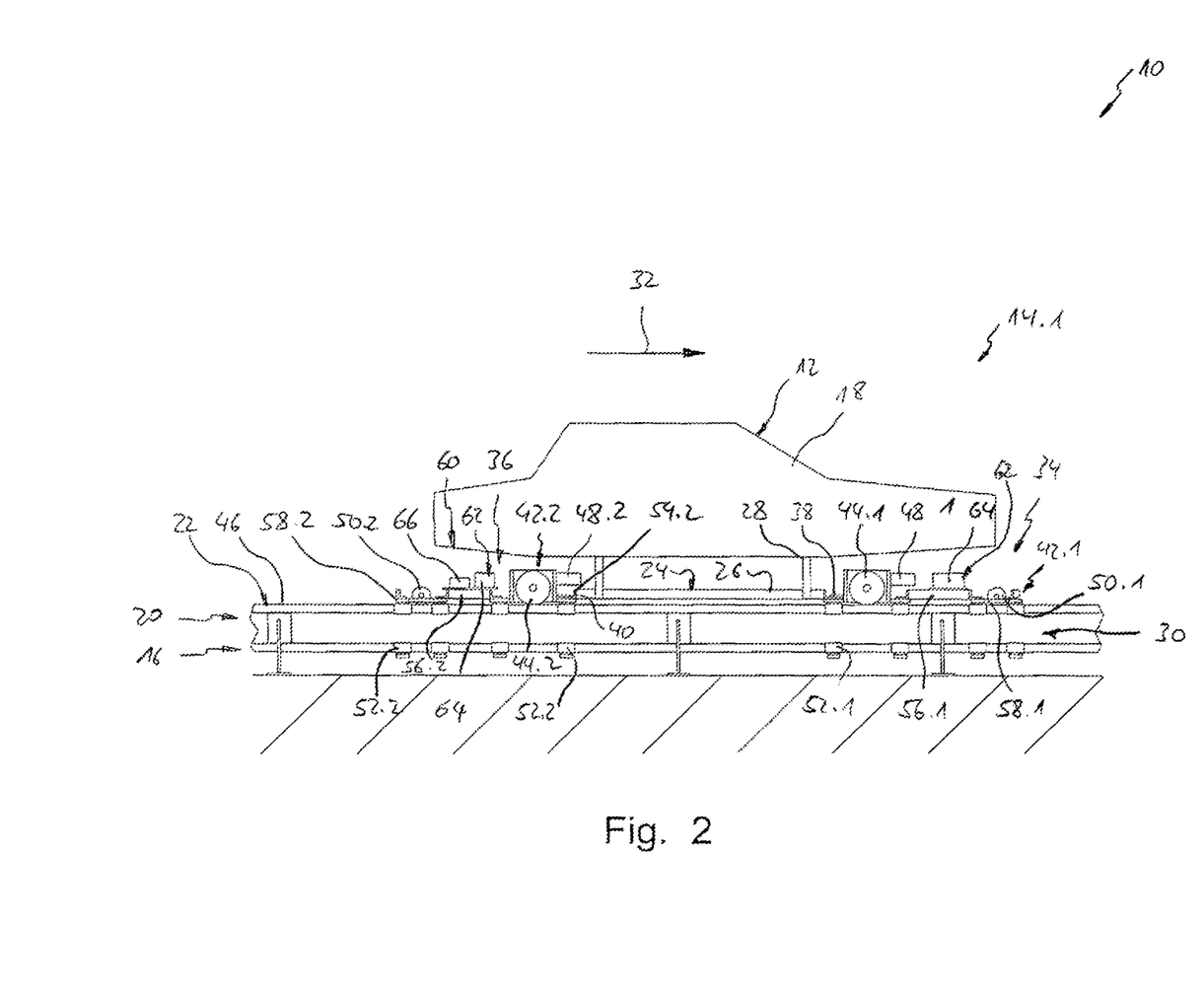
FIG. 2 shows a side view of the portion of FIG. 1, wherein a vehicle body carried by the trolley is additionally shown.

Firstly, reference is made to FIGS. 1 and 2, in which a plant for the transportation of workpieces 12 is denoted by 10. The workpieces 12 are transported on trolleys 14, which are moved on a rail system 16. Below are described four illustrative embodiments, in which the trolleys are denoted by 14.1, 14.2, 14.3 and 14.4. Serving below as an example of workpieces 12 to be transported are vehicle bodies 18; however, the workpieces 12 can also be constituted by other workpieces and, in particular, by add-on parts or mount-on parts of vehicle bodies 18, such as bumpers, side mirrors or the like. Where appropriate, smaller workpieces 12 can be disposed on a workpiece carrier (not specifically shown), which is then transported by the trolley 14.

Of the rail system 16 of the plant 10 is shown, in FIGS. 1 and 2, only a horizontally running portion 20 of a carrier rail 22, on which latter the trolley 14.1 travels and which, in a manner which is known per se, is configured as an I-profile and is anchored to the ground. The thus ground-fixed carrier rail 22 is single-track. Alternatively, a multitrack, in particular two-track, rail system 16 can also be present. Likewise, the conveying plant 10 can also be an overhead conveyor system, as, in terms of its basic principle, is known per se.

The trolley 14.1 comprises a fastening device 24, to which a vehicle body 18 or an appropriate workpiece carrier for workpieces 12 can be fastened. In the present illustrative embodiment, the fastening device 24 is designed to receive vehicle bodies 18. For this, the fastening device 24 comprises a mounting profile 26 with bearing bolts 28, of which respectively only one bears a reference symbol and which, in a manner which is known per se, cooperate with mating elements on the vehicle body 18, so that the vehicle body 18 can be fixed to the fastening device 24. The fastening device 24 can also have several sets of such bearing bolts 28, which are matched to different vehicle bodies 18 having different dimensions and designs, so that the fastening device 28 can be flexibly used for different vehicle body types. The fastening device 24 thus directly receives a vehicle body 18. In another conveying concept, the vehicle body 18 is fastened in a manner which is known per se to a so-called skid, which is then, together with the vehicle body 18, fitted to the fastening device 24.

The trolley 14.1 comprises a trolley chassis 30, which runs down on the carrier rail 22 and supports the fastening device 24. In the present illustrative embodiment, the trolley chassis 30 comprises a leading unit 34, which runs ahead in the transport direction 32, and a trailing unit 36, which runs behind in the transport direction 32. The transport direction 32 is merely indicated in FIG. 2 by an arrow and, in FIGS. 1 to 3 and 5 to 8, shall always point to the right.

The leading unit 34 and the trailing unit 36 are respectively coupled via a coupling joint 38 or 40 with the fastening device and support this between them, so that the trolley 14.1 is capable of also passing through curved portions of the carrier rail 22.

The leading unit 34 and the trailing unit 36 are broadly structurally identical, wherein individual parts and components are positioned on a straight portion of the carrier rail 22 in mirrored arrangement relative to a plane perpendicular to the transport direction 32. Mutually corresponding parts and components of the leading unit 34 and the trailing unit 36 bear the same reference symbols with the indices "0.1" or "0.2". The leading unit 34 forms a chassis unit 42.1, and the trailing unit 36 forms a chassis unit 42.2 of the trolley chassis 30 of the trolley 14.1.

Below, the leading unit 34 is now described; that which has been stated in connection therewith accordingly applies analogously to the trailing unit 36. The leading unit 34 supports a drive roller 44.1, which rolls on a drive running surface 46 of the carrier rail 22 and is driven by means of a drive motor 48.1, which is carried along by the leading unit 34. In the present illustrative embodiment, the drive running surface 46 of the carrier rail 22 is the surface on the top side of the I-profile and accordingly runs in horizontal portions of the carrier rail likewise horizontally. In the event of modifications (not specifically shown), the drive running surface 46 can also, for example, run vertically; in this case, the drive roller 40.1 presses as a friction wheel laterally against the carrier rail 22.

In order to prevent the leading unit 34 from tilting in the transport direction 32, i.e. about a horizontal axis perpendicular to the transport direction 32, the chassis unit 42.1 of the leading unit 34 supports at a distance from the drive roller 40.1 a passive supporting roller 50.1, which likewise rolls on the drive running surface 46 of the carrier rail 22. In addition, the chassis unit 42.1 of the leading unit 34 supports a plurality of lateral guide rollers 52.1, of which only two bear a reference symbol and which from both sides bear against the carrier rail 22 and so, in a manner which is known per se, prevent the leading unit 34 from tilting to the side.

In the present illustrative embodiment, the leading unit 34 comprises a drive frame 54.1, which supports the drive roller 40.1 with the drive motor 48.1 and, with respect to both sides of the carrier rail 22, in each case four guide rollers 52.1. The drive frame 54.1 is connected via a supporting crossbeam 56.1 articulately to a supporting frame 58.1, which, for its part, supports the supporting roller 50.1 and likewise supports, with respect to both sides of the carrier rail 22, in each case four guide rollers 52.1. The articulated connection of the drive frame 54.1 to the supporting frame 58.1 is realized again via coupling joints, which enable passage through curved portions of the carrier rail 22 and correspond to the coupling joints 38, 40, yet are not specifically provided with a reference symbol.

In the present illustrative embodiment, both the leading unit 34 and the trailing unit 36 respectively support a drive roller 44.1 or 44.2, as well as the respectively associated drive motor 48.1, 48.2. In the event of a modification (not specifically shown), it can suffice if a drive roller 44.1 with drive motor 48.1 is present only on the leading unit 34. The trolley chassis 30 of the trolley 14.1 in any event supports at least one drive roller and carries along with it the drive motor of said drive roller.

For the power supply to the drive motors 48.1 and 48.2 of the leading unit 34 and the trailing unit 36, the trolley 14.1 carries along with it an autonomous power supply device 60. By this should be understood a power supply device which ensures the power supply to the drive motors 48.1, 48.2 during running operation, i.e. during the movement of the trolley 14.1, independently from external power sources.

In the present illustrative embodiment, the power supply device is designed with rechargeable energy stores 62 having at least one energy store unit 64. On each chassis unit 42.1, 42.2, an energy store unit 64 for the respective drive motor 48.1, 48.2 is here present. A rechargeable energy store unit 64 for electrical energy can be provided in the form of an accumulator or a capacitor. In the event of a modification (not specifically shown), just a single energy store unit can also be provided for both drive motors 48.1, 48.2. Alternatively, compressed-gas stores can also be present as the power source for compressed-gas drives.

The trailing unit 36 also bears a control device 66, by means of which the drive motors 48.1, 48.2 are controlled and synchronized. The control device 66 communicates with a central control unit (not specifically shown) of the plant 10.

As mentioned above, the trolley 14.1, by virtue of the articulated connection of the fastening device 24 to the leading unit 34 and the trailing unit 36, is curved. In many plants, the trolley 14.1 must also surmount inclined portions, i.e. ascending portions or descending portions, of the carrier rail 22. In inclined portions of this kind, difficulties can arise if the contact pressure of the drive rollers 48.1, 48.2 onto the drive running surface 46 of the carrier rail 22 is insufficient to prevent spinning of the drive rollers 48.1, 48.2 in ascending portions or slippage of the trolley 14.1 in descending portions. A modified trolley 14.2 therefore comprises an additional inclination drive 68, which comes into play only in inclined portions of the carrier rail 22.

Figure 3:
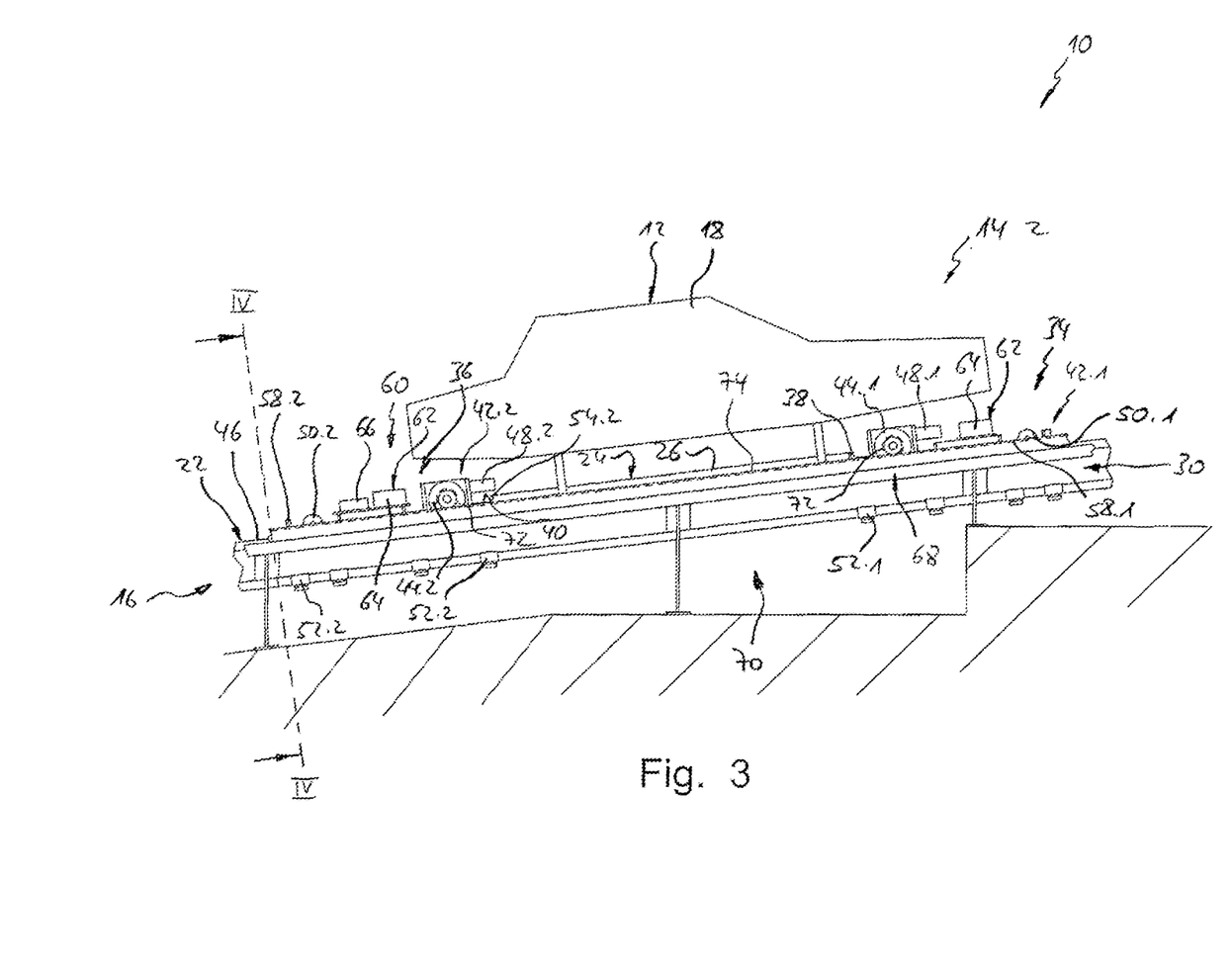
FIG. 3 shows a straight ascending portion of the rail system of the plant according to FIGS. 1 and 2, with a trolley according to a second illustrative embodiment.
Figure 4:
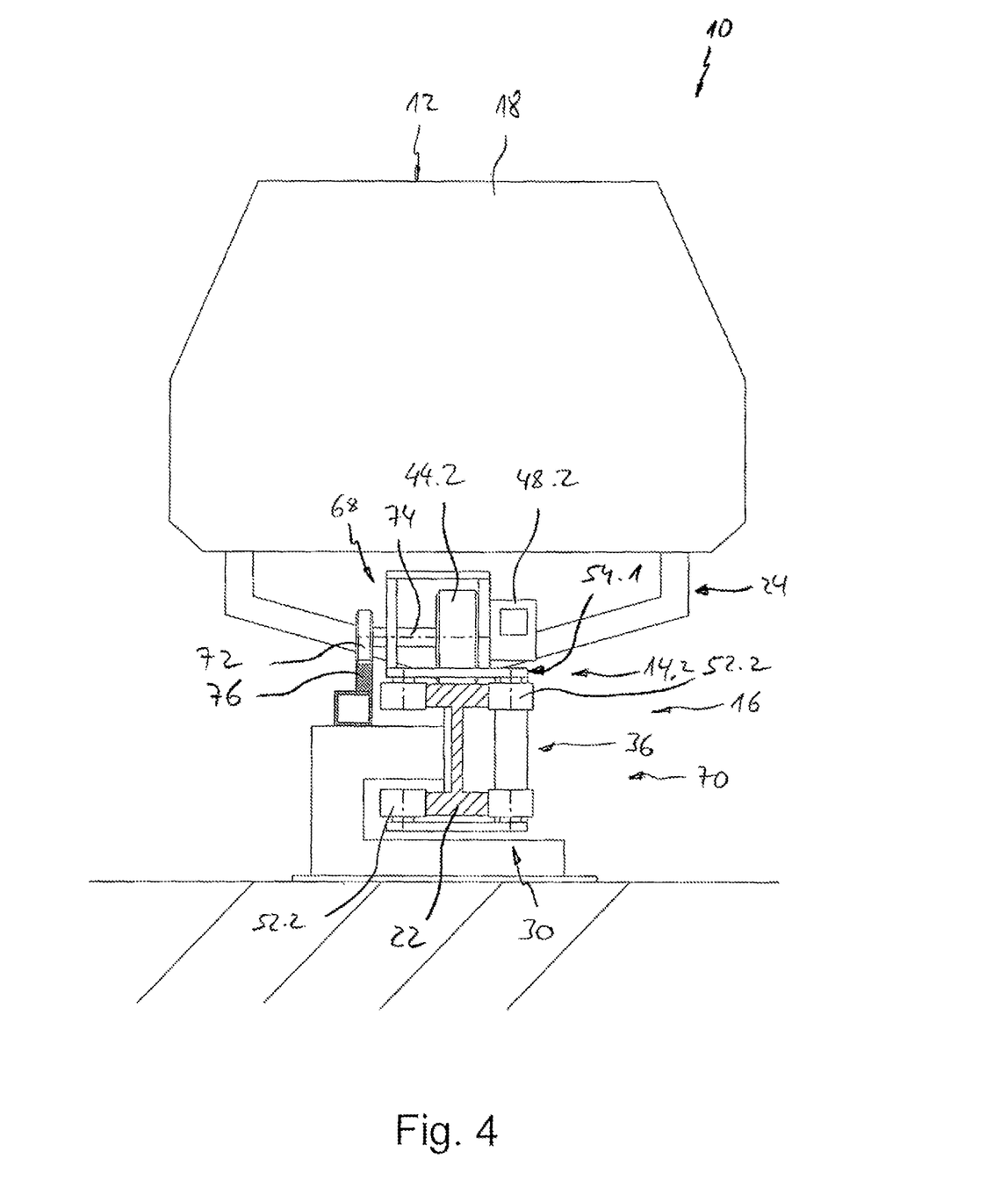
FIG. 4 shows a section perpendicular to the carrier rail along the sectional line IV-IV in FIG. 3.

FIG. 3 shows as an example of an inclined portion of the carrier rail 22 an ascending portion 70, in which this trolley 14.2 is found. As can be seen there and on the basis of FIG. 4, the inclination drive 68 for each drive roller 44.1, 44.2 comprises a gearwheel 72, which is coupled by means of a shaft coaxially, and in a rotationally secure manner, with the respective drive roller 44.1 or 44.2 and thus, upon a rotation of the drive roller 44.1, 44.2, jointly rotates. In the sectional representation in FIG. 4, the supporting frame 58 with its parts is not shown and not all components are provided with reference symbols.

In addition to the carrier rail 22, extending along the ascending portion 70 is a gear rack 76, in which the gearwheel 72 engages when the trolley 14.2 reaches the ascending portion 70. The equivalent applies to a descending portion (not specifically shown here) of the carrier rail 22.

In this case, the arrangement of the gear rack 76 is such that the load is dissipated via the drive rollers 44.1, 44.2 and the propulsion or braking forces are absorbed via the gear rack 76. Instead of the gear rack 76, a chain, in which the gearwheel 72 can engage, can also be present.

In order that the trolley 14.2 can pass through the transition between a horizontal portion 20 and an ascending portion 70 of the carrier rail 22, the coupling joints 38, 40 between the fastening device 24 and the leading unit 34 or trailing unit 36 must also enable pivoting of the mutually connected components about a horizontal pivot axis which runs perpendicular to the transport direction 32.

Figure 5:
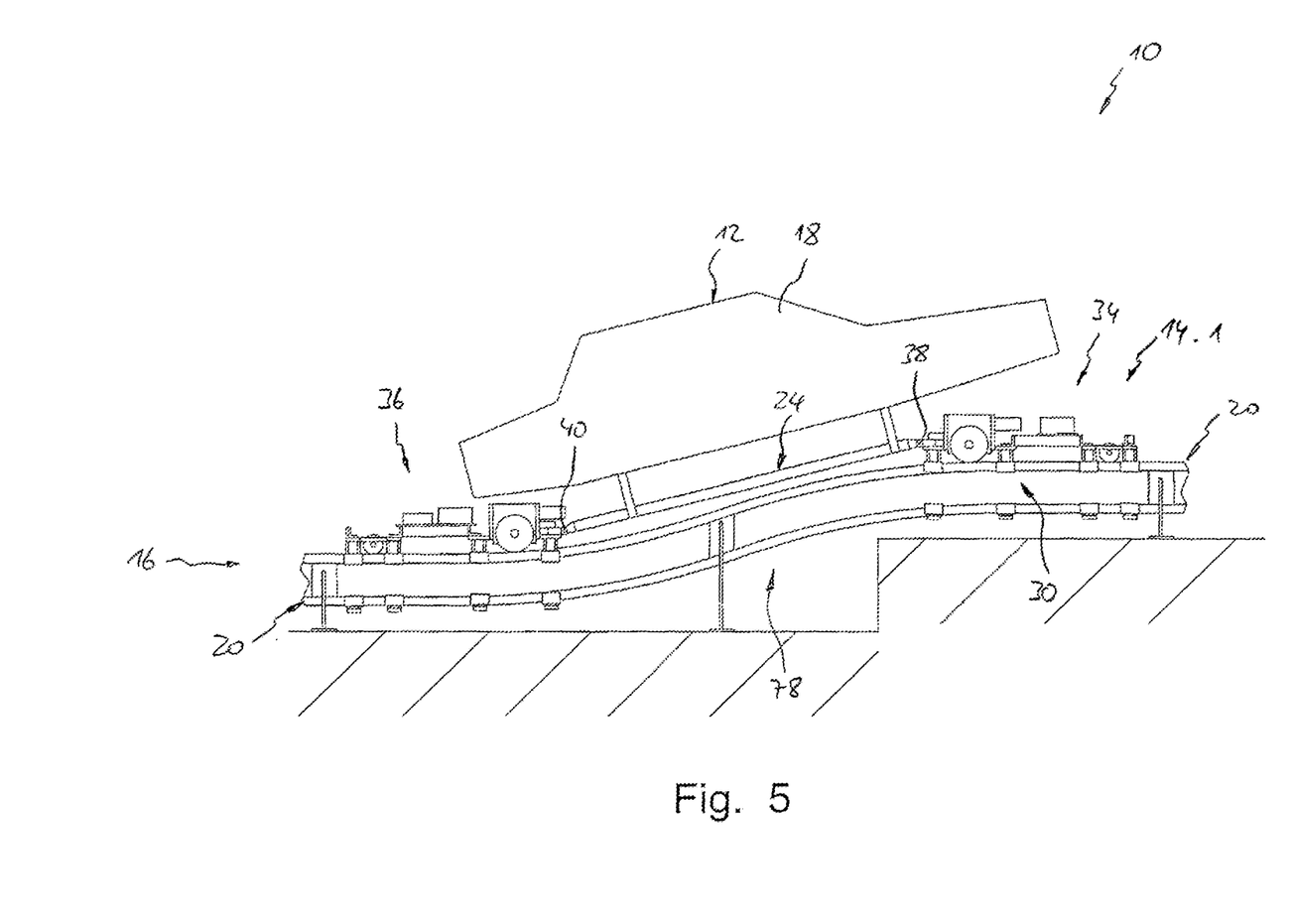
FIG. 5 shows a shorter ascending portion of the rail system of the plant, with the trolley according to FIGS. 1 and 2.

This can be seen in particular in FIG. 5, in which an ascending portion 78 of the carrier rail 22 is illustrated, which ascending portion is sufficiently short that the leading unit 34 or the trailing unit 36 is always found on one of two horizontal portions 20 which run at different height levels and are connected to each other via the ascending portion 78.

In such a case, the inclination drive 70 can possibly be dispensed with, since the reliable propulsion of the trolley is always ensured by the chassis unit 42.1, 42.2, which is found in one of the horizontal portions 20 of the carrier rail 22; in FIG. 5, therefore, the trolley 14.1 is shown again.

In FIG. 5 and in the subsequently described FIGS. 6 to 8, for the sake of clarity not all components are provided with reference symbols. Parts which are not specifically described or labeled correspond to the parts in respect of the trolley 14.1 according to FIGS. 1, 2 and 5 or the trolley 14.2 according to FIGS. 3 and 4.

Figure 6:
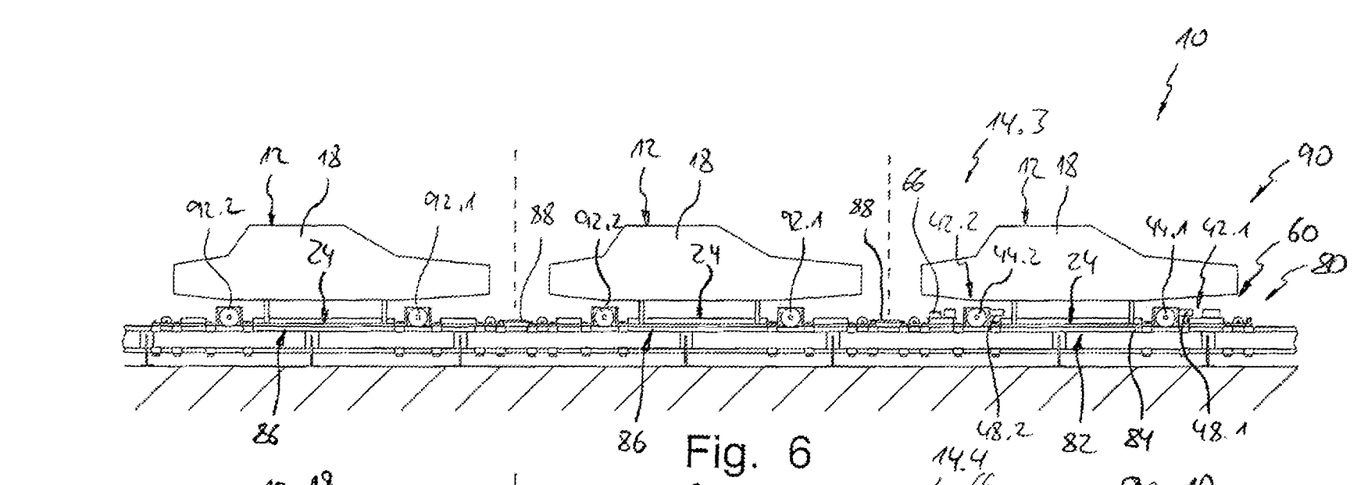
FIG. 6 shows a portion of the carrier rail, with a trolley according to a third illustrative embodiment.

In FIG. 6 is shown a modified trolley 14.3 having a trolley chassis 80 comprising as the drive unit 82 a drivable transport unit 84, and also a plurality of passive transport units 86, which latter are releasably coupled via articulated couplings 88, so that the trolley 14.3 is configured as a transport train 90. The drivable transport unit 84 and the passive transport units 86 respectively carry along with them a fastening device 24. The drivable transport unit 84 here comprises the chassis units 42.1, 42.2 with drive rollers 44.1, 44.2 and drive motors 48.1, 48.2 and thus corresponds to the trolley chassis 30 of the trolleys 14.1, 14.2 according to FIGS. 1 to 5; consequently, the drivable transport unit 84 also carries along with it the power supply device 60.

Following behind the drivable transport unit 84 in the transport direction 32 are the passive transport units 86, which are towed by the drivable transport unit 84. The passive transport units 86 likewise respectively correspond to the trolley chassis 30 of the trolleys 14.1, 14.2 according to FIGS. 1 to 5, with the difference that, instead of the drive rollers 44.1, 44.2, only passive running rollers 92.1, 92.2 are present, and hence no drive motors 48.1, 48.2 and no power supply device 60 are provided.

Figure 7:
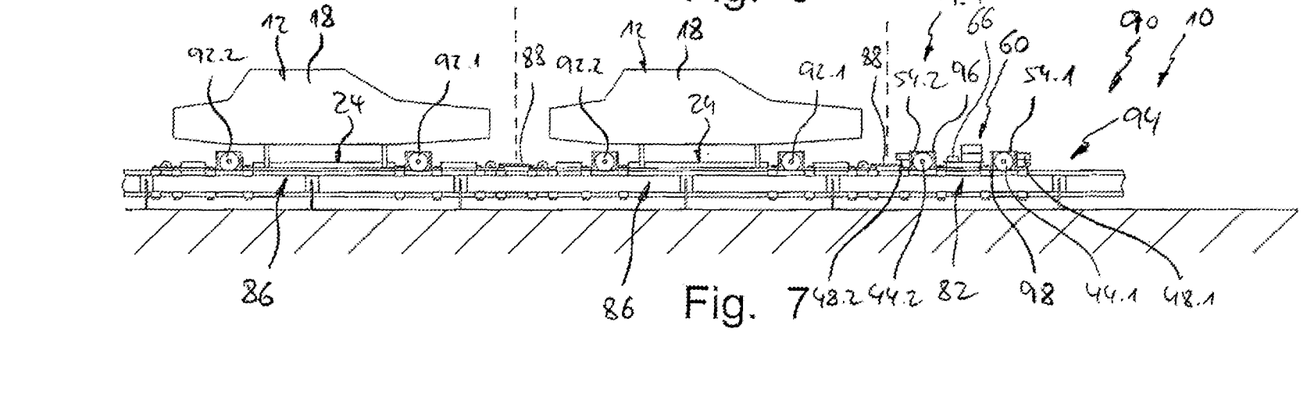
FIG. 7 shows a portion of the carrier rail, with a trolley according to a fourth illustrative embodiment.
Figure 8:
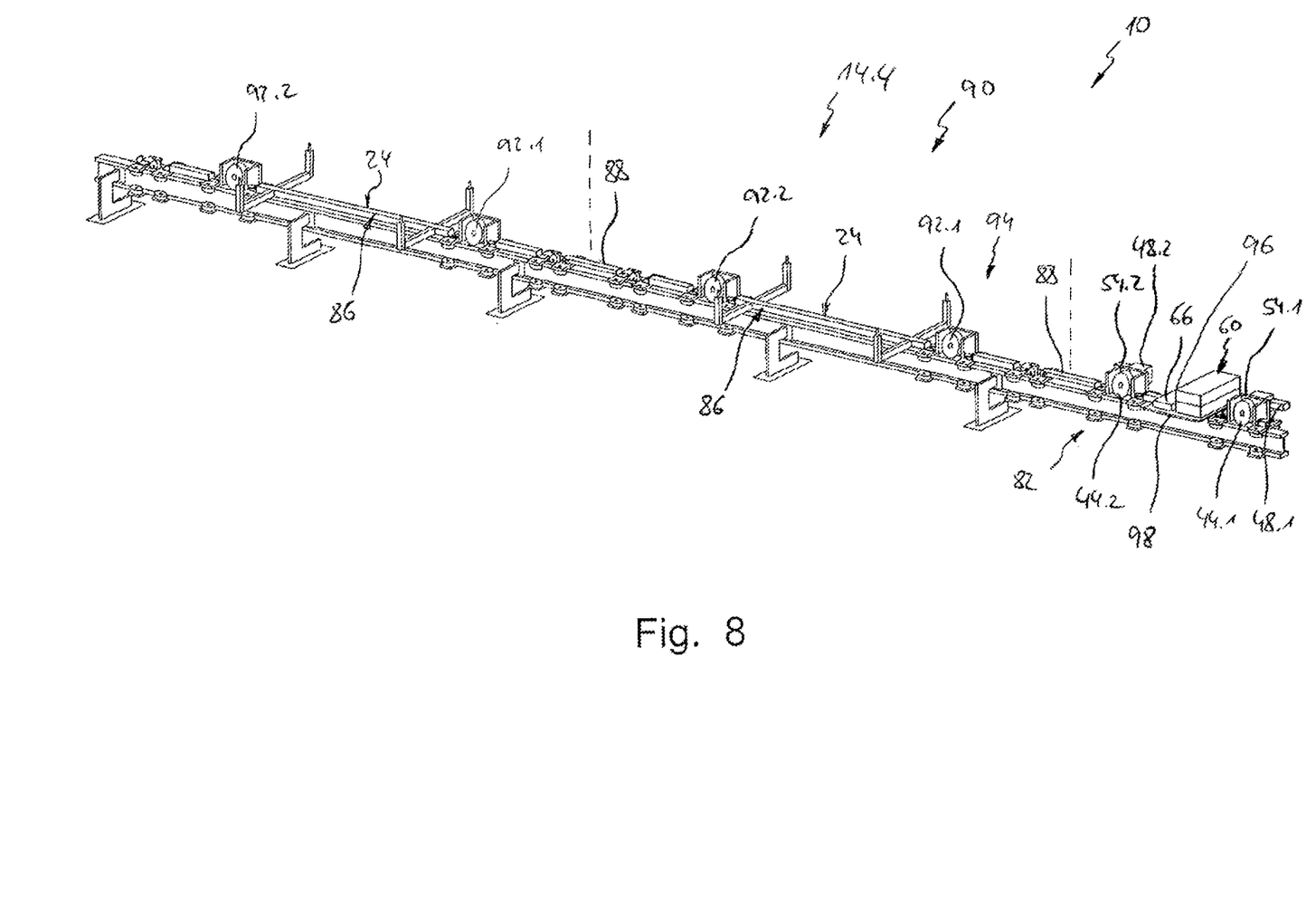
FIG. 8 shows a perspective view of the portion of the carrier rail, with the trolley according to FIG. 7 without vehicle bodies.

In FIGS. 7 and 8 is shown a once again modified trolley 14.4 having a trolley chassis 94 which again a drive unit 82 and a plurality of passive transport units 86. Unlike the trolley chassis 80, the drive unit 82 is not, however, a transport unit with fastening device, but rather a towing trolley 96 without carrying function and having a dedicated chassis unit 98. This is constructed similarly to the leading unit 34, though there two drive frames 54.1, 54.2, with the respectively associated drive roller 44.1 and 44.2 and the necessary drive motors 48.1 and 48.2, are connected to each other. The chassis unit 94 carries along with it a power supply device 60 for its power supply. The towing trolley 96 thus comprises no fastening device 24 and can receive no workpiece 12.

In the event of modifications (not specifically shown), the rechargeable energy stores 62 can also be carried along not by the drive unit 82, but rather by one of the passive transport units 86. Alternatively, there can also be a separate power supply trolley, which only carries along with it the rechargeable energy stores 62 and is disposed, for instance, in the transport train 94 between the drive unit 82 and the following transport unit 86.

Figure 9:
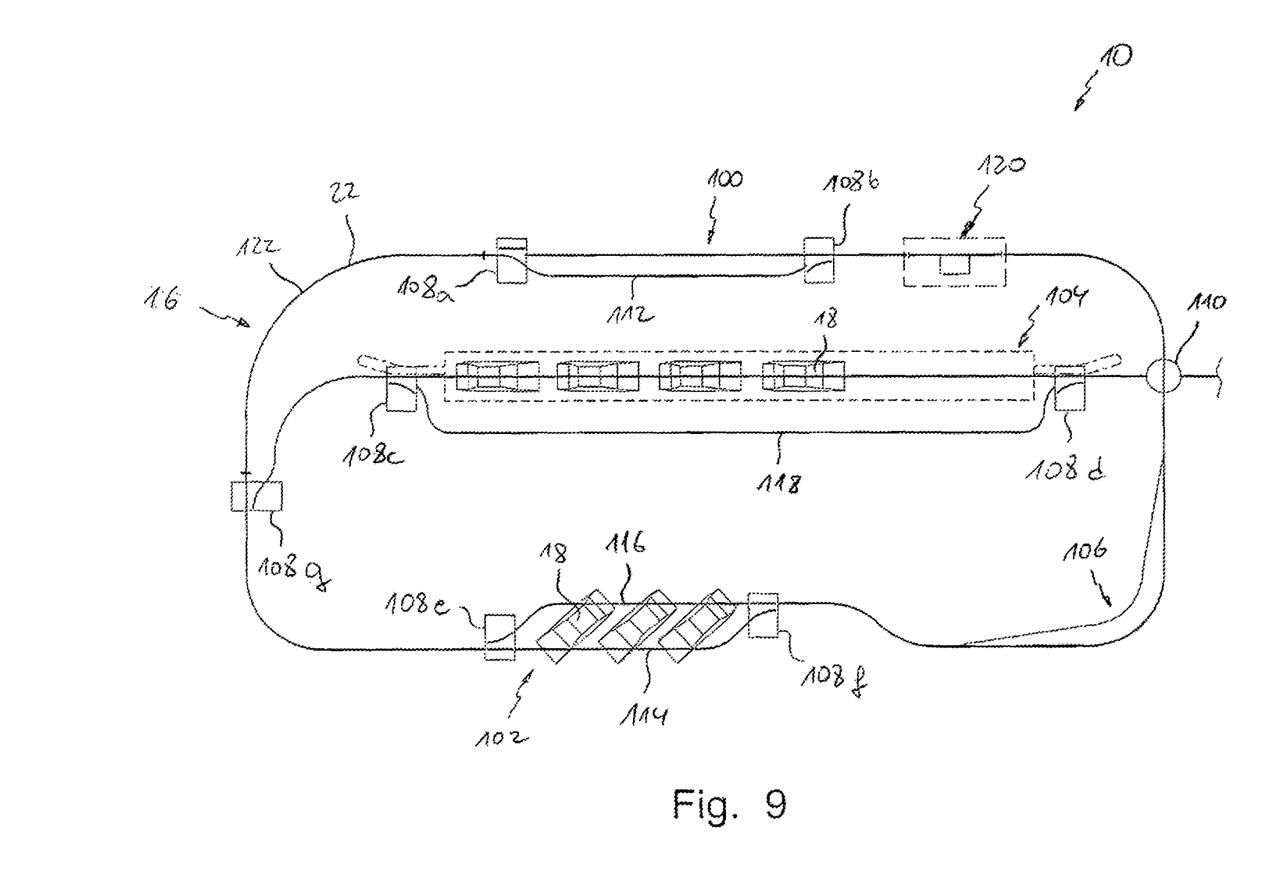
FIG. 9 shows a schematic layout view of a rail system of a plant for the transportation of workpieces.

FIG. 9 now shows in schematic representation a layout of a plant 10 comprising various conveying zones and treatment zones, in which the above-described trolleys 14.1, 14.2, 14.3 and 14.4 can be used.

There, 100 and 102 respectively denote a buffer zone, 104 a dryer, 106 a portion having inclined regions, which in both possible transport directions succeed one another in the form of an ascent and descent. By 108a to 108g are denoted switch points, and by 110 is denoted a rotary switch in order to bridge a track intersection. If the rotary switch 110 is sufficiently large for a trolley 14.1, 14.2, or even for a train-type trolley 14.3, 14.4, a change of direction, for example, can thus also be made at the track intersection.

Into the buffer zone 100 having a buffer track section 112, the trolleys 14.1, 14.2, 14.3, 14.4 enter one behind the other via the switches 108 which are present there. Into the buffer zone 102, on the other hand, only the trolleys 14.1 and 14.2 can enter, since a kind of tilting of the trolleys 14.1, 14.2 takes place there on two parallel track sections 114, 116. This is achieved by virtue of the fact that the leading unit 34 first passes through, for example, the switch 108*f* and pulls onto the track section 114, the switch 108*f* is then switched over, so that the trailing unit 36 makes its way onto the track section 116, and the trolley 14.1, 14.2, due to the rotary couplings 38, 40 which are present, can turn diagonally, as is indicated by the position of the vehicle bodies 18 in the buffer zone 102.

At the dryer 104, in particular the carrying trolleys 14.3 and 14.4 are used. In this way, only a small number of drive components are exposed to the hot dryer atmosphere. In the case of the trolley 14.4, it is also possible for the towing trolley 96 which is present there to transfer the passive transport units 86 to an alternative conveying method, such as, for instance, a conveyor chain or the like, by means of which the passive transport units 86 are then conveyed through the dryer 104. The towing trolley 96 can then be led past the dryer 104 on a track section 118 and, at the dryer outlet, can reclaim possession of the passive transport units 96 leaving the dryer 104.

By 120 is denoted, by way of example, a charging station, into which the chassis of the trolleys 14.1, 14.2, 14.3 or 14.4, which chassis are fitted with the rechargeable energy stores 62, enter and can be charged. In practice, such charging stations 120 are present on a side track, which can likewise be reached via switches.

Such charging stations 120 can be visited specifically for a charging process when the charging state of the energy stores 62 of the trolleys 14.1, 14.2, 14.3 or 14.4 reaches a lower threshold value. Charging stations 120 can also be formed at loading or unloading stations at which the trolleys 14.1, 14.2, 14.3 or 14.4 are loaded or unloaded. In this way, the dwell time of the trolleys 14.1, 14.2, 14.3 or 14.4 can be utilized for a charging operation.

If the energy stores 62 have a sufficiently large capacity and the trolleys 14.1, 14.2, 14.3 or 14.4 hence have a large range, the plant 10 makes do with a relatively small number of charging stations 120. In the case of accumulators as the energy stores 62, this can be implemented well.

In another concept, the capacities of the energy stores 62 and the distances between two charging stations 120 can be mutually coordinated such that the charged energy stores 62 can only receive so much energy that the trolleys 14.1, 14.2, 14.3 or 14.4 can bridge the path between two charging stations 120. As the energy stores 62, capacitors, in particular, can be considered in such a case.

Alternatively or additionally to such charging stations 120, the carrier rail 22 can comprise charging portions 122 which are fitted with a busbar, from which, via a contact shoe or contactlessly, power can be received by the trolleys 14.1, 14.2, 14.3 or 14.4. To this end, the trolleys 14.1, 14.2, 14.3 or 14.4 carry with them appropriate current collectors. In FIG. 9, the portion between the switches 108*a* and 108*g* is labeled as the charging portion 122. When the trolleys 14.1, 14.2, 14.3 or 14.4 pass through such charging portions 122, the existing energy store or stores 62 is/are charged.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

We claim:

1. A plant for the transportation of workpieces comprising:
   a) a rail system, which comprises at least one carrier rail, wherein the at least one carrier rail is a single rail which comprises a single track;
   b) at least one trolley movable in a transport direction on the at least one carrier rail, wherein
   c) the at least one trolley comprises
      a trolley chassis, which supports at least one drive roller that is drivable by means of at least one drive motor which is carried along by the trolley chassis and at least one gearwheel coupled to the at least one drive roller so that the at least one gearwheel jointly rotates with the at least one drive roller, the trolley chassis comprising a leading unit, which runs ahead in a transport direction, and a trailing unit, which runs behind in the transport direction; and
      at least one fastening device for at least one workpiece, the leading unit and the trailing unit being coupled together by the at least one fastening device for at least one workpiece, wherein the leading unit is coupled to the at least one fastening device with a first rotary coupling and the trailing unit is coupled to the at least one fastening device by a second rotary coupling,
      wherein
      at least one of the leading unit or the trailing unit carries an autonomous power supply device which supplies the drive motor with power, and
      each of the leading unit and the trailing unit comprise a support frame, each support frame supporting a passive supporting roller, wherein the passive supporting roller of each of the leading unit and the trailing unit and the at least one drive roller are all configured to roll on a single drive running surface of a carrier rail.

2. The plant as claimed in claim 1, wherein the at least one carrier rail is fixed to the ground.

3. The plant as claimed in claim 1 further comprising at least one gear rack, the at least one gear rack being located proximate an incline or decline in the rail system and engaging the at least one gearwheel as the trolly chassis travels along the incline or decline in the rail system.

4. The plant as claimed in claim 1 wherein the leading unit comprises a plurality of guide rollers, wherein
   the passive supporting roller of each of the leading unit and the trailing unit and the at least one drive roller are all configured to roll on a first surface of the single rail;
   a first portion of the plurality lateral guide rollers are configured to bear against a second surface of the single rail; and
   a second portion of the plurality of guide rollers bears against a third surface of the single rail.

5. The plant as claimed in claim 1, wherein the autonomous power supply device of the trolley comprises at least one rechargeable energy store.

6. The plant as claimed in claim 5, wherein
   a) the leading unit of the trolley bears a first drive roller and a first drive motor; and/or
   b) the trailing unit of the trolley bears a second drive roller and a second drive motor; wherein
   c) the leading unit and/or the trailing unit bear(s) at least one rechargeable energy store.

7. The plant as claimed in claim 1, wherein the trolley is configured as a transport train, in which the trolley chassis comprises a drive unit and one or more passive transport units, which are releasably coupled with one another, wherein the one or more passive transport units respectively comprise a fastening device.

8. The plant as claimed in claim 7, wherein the trolley chassis comprises as the drive unit a drivable transport unit, having a chassis which carries the at least one drive roller along with the trolley chassis and a fastening device for at least one workpiece.

9. The plant as claimed in claim 7, wherein the trolley chassis comprises as the drive unit a towing trolley without carrying function and having a chassis unit which carries along with the trolley chassis the at least one drive roller.

10. The plant as claimed in claim 7, wherein the drive unit carries along the autonomous power supply device.

* * * * *